United States Patent [19]
Dams et al.

[11] Patent Number: 6,016,247
[45] Date of Patent: Jan. 18, 2000

[54] ELECTRICITY DISTRIBUTION SUBSTATION

[75] Inventors: Joachim Dams, Mauguio; Thierry Starck, Castries, both of France

[73] Assignee: GEC Alsthom T&D SA, Paris, France

[21] Appl. No.: 09/055,702

[22] Filed: Apr. 7, 1998

[30] Foreign Application Priority Data

Apr. 8, 1997 [FR] France ................................. 97-04261

[51] Int. Cl.[7] .................................................. H02B 5/00
[52] U.S. Cl. .......................................................... 361/602
[58] Field of Search ................................... 361/602, 603, 361/618, 619, 620

[56] References Cited

U.S. PATENT DOCUMENTS

| 4,752,860 | 6/1988 | Ramanet ................................ 361/602 |
| 5,757,614 | 5/1998 | Hachida et al. ....................... 361/602 |

FOREIGN PATENT DOCUMENTS

| 0563535A1 | 10/1993 | European Pat. Off. . |
| 0624924A2 | 11/1994 | European Pat. Off. . |
| 2423897 | 11/1979 | France . |
| 9420193 | 3/1995 | Germany . |
| 29501081 | 5/1995 | Germany . |

*Primary Examiner*—Neil Abrams
*Attorney, Agent, or Firm*—Sughrue, Mion, Zinn, Macpeak & Seas, PLLC

[57] ABSTRACT

A substation of the "one-and-one-half breaker" type has three identical gastight cubicles in the form of a rectangular parallelepipeds (11, 11', 11") each containing one circuit breaker and two disconnects, and each having electricity lead-ins for connecting the disconnectors with external busbars and/or cables. The lead-ins are disposed in oblique rows through the top face of each cubicle in a front row of lead-ins (27, 27A, 27B) and in a parallel rear row of lead-ins (27', 27'A, 27'B). The two outermost cubicles (11, 11") have lead-ins, front lead-ins in one case and rear lead-ins in the other, fitted for connection to a respective incoming feeder. The middle cubicle (11') has the lead-ins of the one row individually connected by interconnections busbars (35) to the lead-ins constituting a row of the one of the adjacent cubicles that is not fitted for connection to an incoming feeder. Two cubicles (11, 11") have lead-ins in a row fitted for connection both to an interconnection busbar ad to a cable of an outgoing feeder.

6 Claims, 5 Drawing Sheets

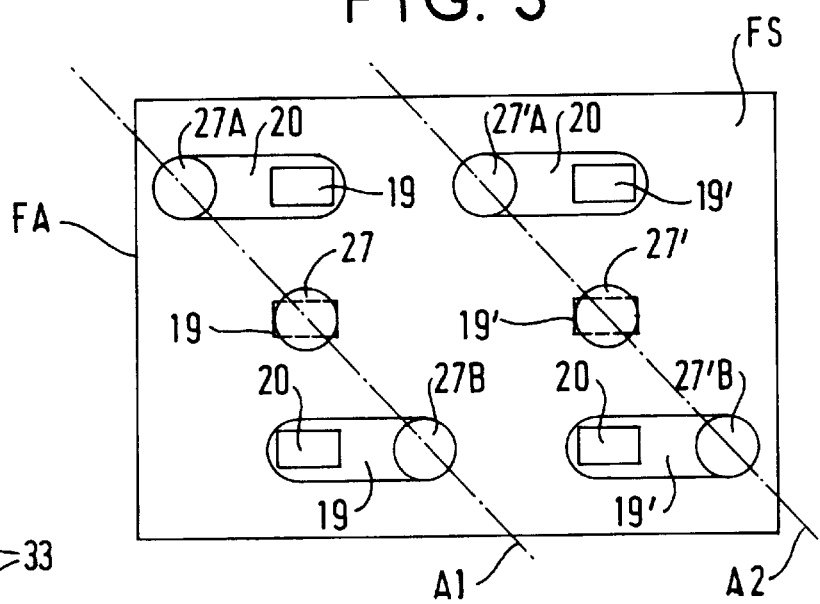
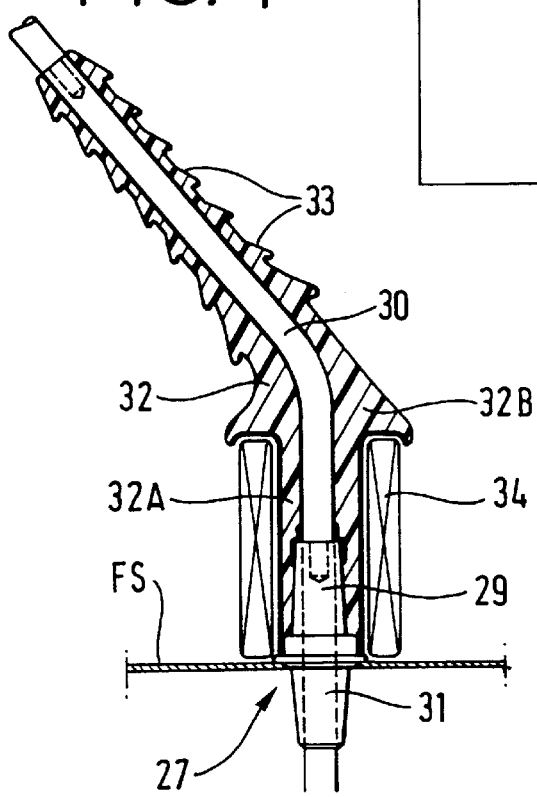
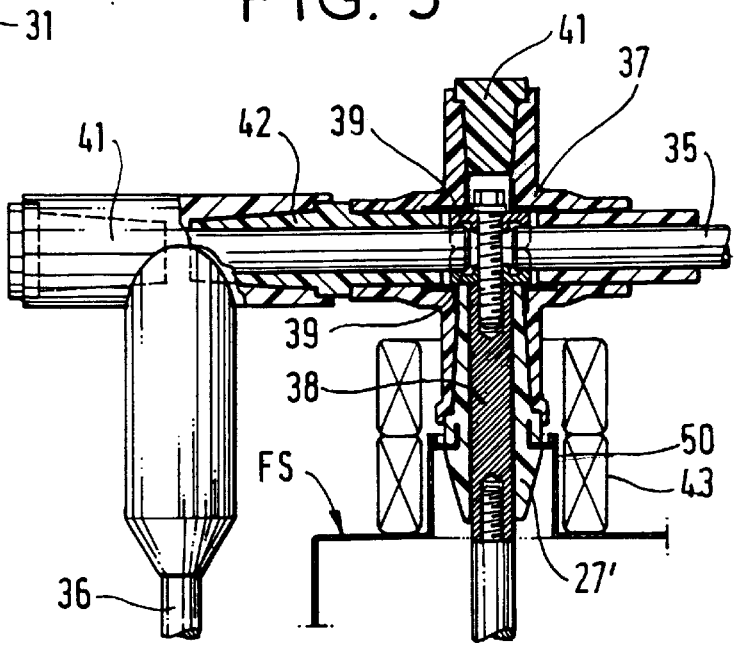

ID NUMBER 6,016,247

ELECTRICITY DISTRIBUTION SUBSTATION

The invention relates to a medium voltage electricity distribution substation implemented using a circuit of the so-called "one-and-a-half breaker" type.

BACKGROUND OF THE INVENTION

As is known, "one-and-a-half breaker" substations serve to feed two separate outgoing feeders provided by cables from one or other of two incoming feeders provided by overhead lines or cables, using a configuration that requires only a small number of circuit breakers. This configuration is shown diagrammatically in FIG. 1, having two possible incoming feeders and two possible outgoing feeders.

Each of the two incoming feeders 1, 1' is powered via a polyphase link 2, or 2' (generally a three-phase link) which is connected to an incoming disconnector 3 or 3'. A circuit breaker 4 or 4' is located downstream from each incoming disconnector going away from the link 2 or 2' that terminates on said incoming disconnector, and serves in turn to feed cables 5 or 5' via respective so-called "intermediate" disconnectors 6 or 6'.

An additional circuit breaker 4" is connected between two disconnectors 7 and 7' referred to as "middle" disconnectors which are connected one to the fixed contacts and the other to the moving contacts of the interrupter chambers (not shown) of said circuit breaker for each of the power phases. It is the circuit breaker 4" that acts as the half breaker for the "one-and-a-half breaker" substation.

Each middle disconnector 7 or 7' is also connected to the cables of a respective one of the outgoing feeders 5 or 5' together with one of the intermediate disconnectors 6 or 6'.

Toroidal type current transformers 8 are mounted for measurement and management purposes on each incoming feeder 1, 1' upstream from the correspond incoming disconnector 3 or 3', and on each outgoing feeder 5, 5' downstream from each of the two disconnectors connected to a given outgoing feeder, i.e. its intermediate disconnector 6 or 6' and its middle disconnector 7 or 7'.

The subassemblies such as the circuit breakers, the disconnectors, and the current transformers that make up such substations are generally separate from one another and are interconnected as required by conductive links implemented in the form of air-insulated busbars. A substation of this kind is therefore of large dimensions and as a general rule gives only a limited picture of the overall circuit to which it corresponds.

OBJECTS AND SUMMARY OF THE INVENTION

The invention therefore provides a medium voltage electricity distribution substation, implemented using a so-called "one-and-a-half breaker" type circuit, obtained by associating circuit breakers and disconnectors in a cell arrangement enabling two distinct outgoing feeder cables to be fed from one and/or the other of two incoming feeder cables and/or overhead lines.

According to a characteristic of the invention, the arrangement of the substation cells is made up of three identical, gastight, cubicles in the form of adjacent rectangular parallelepipeds made of sheet metal, each of which receives in particular a circuit breaker and two disconnectors electrically located on opposite sides of the circuit breaker, each cubicle having a top face including through orifices for electricity lead-ins enabling "link" tabs of the disconnectors to be connected by electrical conduction with conductive busbars and/or electrical cables outside the cubicle, said orifices being disposed obliquely in two parallel rows on the top face of the cubicle causing the lead-ins being disposed relative to the front face of the cubicle in a "front" first row of electricity lead-ins, and a "rear" second row of electricity lead-ins, the two outermost cubicles having in one case front lead-ins and in the other case rear lead-ins fitted for connection to the wires of an incoming feeder, whether an overhead line or a cable, the cubicle placed between the other two having firstly front lead-ins connected by interconnection busbars to the front lead-ins of the adjacent cubicle whose rear lead-ins are fitted for connection to an incoming feeder, and secondly rear lead-ins connected by other interconnection busbars to the rear lead-ins of the adjacent cubicle whose front lead-ins are fitted for connection to an incoming feeder, two of the cubicles each having a row of lead-ins fitted to be connected simultaneously to the interconnection busbars connecting them to the lead-ins of another cubicle as mentioned, and to the cables of a respective different outgoing feeder.

According to a characteristic of the invention, the cubicles are aligned with their interconnection busbars parallel to the alignment axis, and the electricity lead-ins in a same row which are fitted to be connected to outgoing feeder cables are placed on the outermost cubicles and carry connectors enabling each of the cables of an outgoing feeder and also an interconnection busbar to be connected thereto.

According to a characteristic of a variable of the invention, the cubicles are disposed side by side in an offset disposition, so that their interconnection busbars which are parallel unite the front electricity lead-ins of each of the cubicles that is offset rearwards relative to an immediately adjacent cubicle with the rear electricity lead-ins of said adjacent cubicle, and the electricity lead-ins in a given row which are fitted to be connected to outgoing feeder cables are the rear lead-ins of the two immediately adjacent cubicles which are the least shifted rearwards.

BRIEF DESCRIPTION OF THE DRAWINGS

The invention, its characteristics, and advantages are described further in the following description given with reference to the figures mentioned below.

FIG. 3 is a fragmentary circuit diagram of a FIG. 2 cell and seen from above and notionally looking through the top face of the cubicle of said cell.

FIG. 4 shows a subassembly for connecting a FIG. 2 cell to a line wire via a electricity lead-in that is insulated by means of a sleeve.

FIG. 5 shows a subassembly for connecting a FIG. 2 cell to a single pole incoming cable and to a busbar insulated by means of a connector.

MORE DETAILED DESCRIPTION

Figure 2:
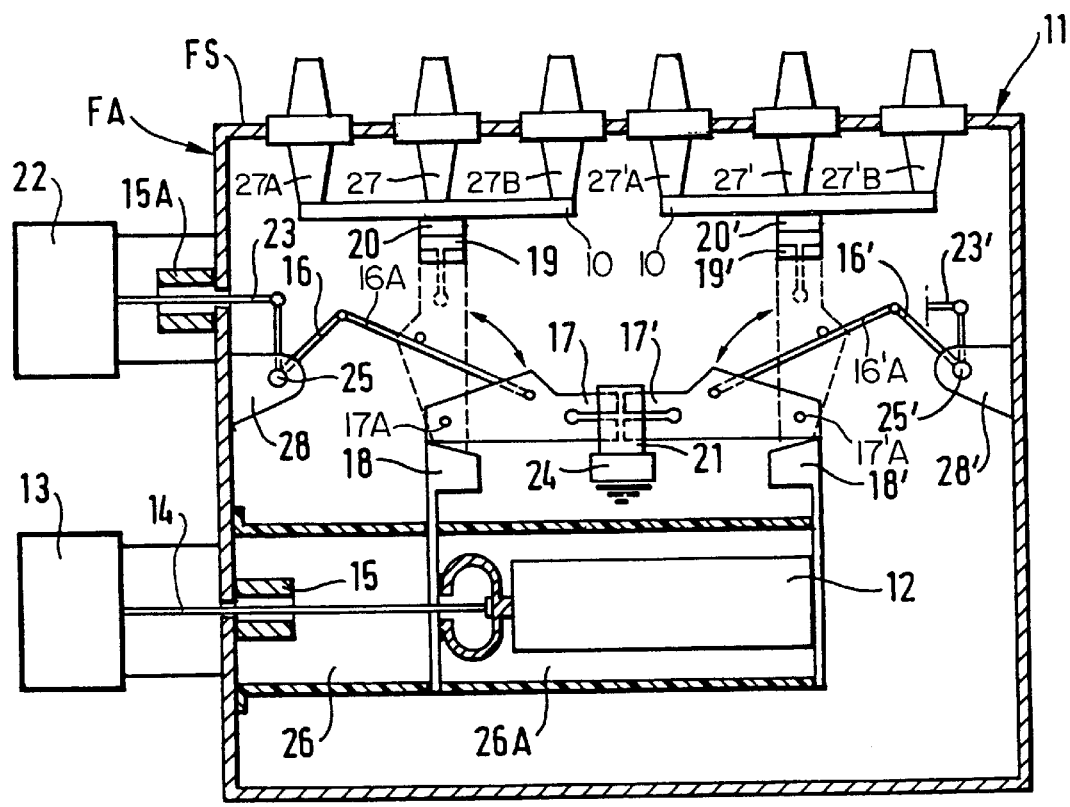
FIG. 2 is a section view through an example of a cell having a gastight metal cubicle for a substation as shown in the diagram of FIG. 1, the cubicle housing at least one circuit breaker and two disconnectors.

The invention provides for making a "one-and-a-half breaker" type substation by means of cells of the kind shown in FIG. 2.

Each cell comprises a cubicle 11 in the form of a rectangular parallelepiped that is preferably in the shape of a cube, that is made in a manner known to the person skilled in the art suitable for ensuring that it is gastight.

The cubicle 11, which is assumed in this case to be made of sheet metal, is designed to contain various elements of electrical equipment including the component elements of at least one circuit breaker having interrupter chambers 12 on respective axes extending perpendicularly to one of the walls which forms the front face FA of the cubicle.

The interrupter chambers of the circuit breaker are disposed side by side in a horizontal plane, and in this case they are assumed to be in alignment on either side of the chamber shown in FIG. 2. By way of example, the chambers may be of the type having a vacuum interrupter chamber or of the type having a chamber filled with a protective dielectric gas such as $SF_6$.

A circuit breaker drive mechanism 13 is located in front of the cubicle. It includes at least one drive rod 14 of electrically insulating material that passes through the front face FA by a gastight feedthrough device 15 and controls the interrupter chambers 12. These chambers are carried by respective insulating supports 16 that are fixed horizontally to the wall of the front face FA inside the cubicle 11.

The cubicle 11 is designed to be capable of containing the elements of first and second disconnectors which are located above the interrupter chambers 12 of the circuit breaker in the cubicle. Each disconnector has three pairs of moving contact blades, with only one blade of each disconnector being shown herein, such as the blade 17 for the first disconnector and the blade 17' for the second. These pairs of blades are directly hinged through pivots 17A and 17'A to respective stationary and conductive individual carrier pieces such as the pieces 18 and 18'.

Each interrupter chamber 12 has its moving contact connected to one of the carrier pieces 18 and its fixed contact connected to the other carrier piece 18', with the carrier pieces 18 and 18' being fixed on insulating supports 16 belonging to the cubicle.

In a "working" position, the three pairs of moving blades 17 or 17' of a disconnector are in contact with three fixed conductor tabs referred to herein as "link" tabs, such as 19 or 19' situated beneath the wall constituting the top face FS of the cubicle 11. In a preferred embodiment, the blades extend vertically or almost vertically, as shown in dashed lines, when they are in the working position.

In a "grounding" position the pairs of moving blades of a disconnector are in contact with three grounding tabs, in this case common to the two disconnectors. These tabs are connected to a ground collector of the cubicle 11, and only one of these tabs 21 is shown in FIG. 2. In the embodiment proposed, each moving blade extends horizontally or almost horizontally, as shown in solid lines, when it is in its grounding position.

In an isolating position, the moving blades of a disconnector are electrically isolated from the link tabs 19 or 19' and from the grounding tabs 21, e.g. by being tilted halfway between the two above-mentioned positions.

In known manner, the moving blades such as 17 of the first disconnector, closer to the front face FA are driven by a control mechanism 22 outside the cubicle 1. A drive rod 23 of the control mechanism passes through the front face FA via a gastight feedthrough device 15A that is identical or similar to the above-mentioned gastight feedthrough device 15. This drive rod 23 acts on a mechanism comprising a shaft 25, levers 16, and insulating rods 16A. The drive rod 23 acts on a lever which causes the shaft 25 to pivot through an angle. The shaft drives three levers individually, causing the three moving blades 17 to move from one position to another by means of the insulating rods 16A.

In this case, the shaft 25 is carried by bearings 28 fixed on the front face FA inside the cubicle 11, with only one of the bearings 28 being shown.

In the proposed embodiment, the two disconnectors are disposed symmetrically about a vertical plane (not shown) passing through the grounding tabs, said plane being parallel to the front face FA of the cubicle.

The second disconnector has a control mechanism outside the cubicle 11 like the control mechanism 22 adjacent to which it is situated at the front of said cubicle. This mechanism has a drive rod 23' (shown in part) which passes through the front face FA via a gastight feedthrough device identical or similar to the above-mentioned gastight feedthrough device 15, so as to extend along one of the side walls of the cubicle and terminate on one of the levers 16' of a motion transfer system analogous to the lever system 16. The drive rod 23' causes a shaft 25' to pivot which has levers 16' mounted thereon to control the displacements of the moving blades of the second disconnector between the above-mentioned positions. The shaft 25' is carried on bearings 28' which are fixed to the wall remote from the front face FA of the cubicle, with only one of these bearings being visible in FIG. 2.

In a preferred embodiment, the grounding tabs 21 are carried by a common support which is a metal cross-member 24 positioned in the central portion of the cubicle, between the two side walls thereof, said cross-member also serving as reinforcement and providing the cell with enhanced ability to withstand pressure rises or pressure drops.

The link tabs 19 and 19' are designed to be electrically connected to conductors of the busbar, cable, or overhead wire type situated outside the cubicle.

For this purpose, they are connected to electricity lead-ins 27 and 27' enabling electricity to be conveyed by conduction while keeping the cubicle gastight relative to the outside environment. These electricity lead-ins are mounted in gastight manner on the cubicle via orifices provided for this purpose in its top face FS.

In the example shown in FIG. 2, the electricity lead-ins carried by the cubicle 1 are disposed vertically and are distributed in alignment in two rows on the top face FS of the cubicle which is of rectangular appearance (as can be seen in FIG. 3) or may even be square. In one embodiment, the alignment axes A1—A1, A2—A2 of each of the rows of electricity lead-ins of a cubicle are parallel and disposed obliquely relative to planes corresponding to the front face FA and to the top face FS of the cubicle, e.g. at 45° as shown in FIG. 3. The electricity lead-in 27 connected to the fixed central link tab 19 of the first disconnector is directly positioned above said tab and the corresponding moving blade 17, when said blade is in its working position, as shown in FIG. 2. The same applies to electricity lead-in 27' connected to the central link tab 19' of the second disconnector which is also directly positioned above said central tab 19' and the corresponding moving blade 17' when said blade is in its working position. The other two electricity lead-ins such as 27A and 27B or 27'A and 27'B which are in alignment on either side of a central electricity lead-in 27 or 27' are connected to the corresponding tabs 19 by conductor bars 20 or 20'.

As already mentioned, the link tabs 19, 19' are in alignment in threes parallel to the front face of the cubicle and the lead-ins are disposed obliquely.

In the embodiment shown, the two bars 20 each connected to one of the two electricity lead-ins 27A and 27B through bar 10 are disposed symmetrically about a vertical plane parallel to the front face and passing through the axes of the central electricity lead-in 27 and of the corresponding link tab 19 in the cubicle. The same applies to the bars 20' connected through bar 10' to the lead-ins 27'A and 27'B concerning a vertical plane parallel to the preceding plane and containing the axes of the central electricity lead-in 27' and the corresponding link tab 19'.

Such a disposition makes it possible to achieve coupling between a three-phase link element situated outside the cubicle and connected to the electricity lead-ins 27, 27a, and 27B and a three-phase link element situated outside the cubicle and connected to the electricity lead-ins 27'A, 27'B, and 27'. Coupling takes place in this case via a succession of elements including a first moving blade disconnector 17, a circuit breaker having interrupter chambers 12, and a second moving blade disconnector 17'.

These two disconnectors are disposed symmetrically about a vertical plane (not shown) assumed to include the grounding tabs 21, said plane being parallel to the front face FA of the cubicle. In this case, the first disconnector is assumed to be situated in the top front quarter of the cubicle beneath the bars 20 connected to its link tabs and the corresponding "front" electricity lead-ins 27, 27A, and 27B, while the second disconnector is assumed to be situated in the rear top quarter beneath the bars 20' connected to its tabs and the corresponding "rear" electricity lead-ins 27'A, 27'B, and 27'.

Two examples of electricity lead-in implemented in gastight manner are given in FIGS. 4 and 5. These lead-ins are designed to enable a "one-and-a-half breaker" type distribution substation to be made by means of cubicle cells of the kind described above.

The air-gas type electricity lead-in 27 that is shown in FIG. 4 is designed to be connected to one of the phase wires of an overhead distribution line, and it includes gasket type means enabling it to be gastight, as is known in the art. An external conical connection piece 29 of said electricity lead-in receives a single pole link conductor 30 outside the cubicle 1 which is connected to one wire of an overhead line (not shown). A connection internal portion 31 of said electricity lead-in is connected to a conductive tab of the disconnector inside the cubicle, as described above.

A sleeve of insulating elastomer material 32 covers the single pole conductor 30 and is engaged on the conical portion 29. It is dimensioned in conventional manner to enable the necessary dielectric distances to be obtained between the phase conductors and between the phase conductors and ground. It also has circular fins 33 so as to increase the length of its creepage distance.

The single pole conductor 30 can be curved in conventional manner so as to increase the dielectric distances at the end of the lead-in while maintaining small distances between the electricity lead-ins 27 or 27'.

In a preferred embodiment, the sleeve 32 has a cylindrical portion which is covered in a conductive grounding layer that also enables a toroidal current transformer 34 to be installed around said cylindrical portion. The transformer is positioned around the external portion of the electricity lead-in concerned, e.g. on a cylindrical portion 32A of the sleeve, in particular where it covers the conical portion 29 and a portion of single pole conductor. A flared second portion 32B deflects the electric field at the end of the conductive layer. The conductive layer of each sleeve terminates in flared or circularly-arcuate manner level with the second portion 32B above the lead-ins so as to reduce the electric field at the end of the conductive layer.

The electricity lead-in referenced 27' and shown in detail in the subassembly of FIG. 5 is designed to be connected to an external conductive bar 35 by means of a connector 37 and/or an external single pole cable 36 via a connector 41. In the example shown, the connector 37 is of the cross type and it is engaged on a insulating overmolded portion of the electricity lead-in 27' which is fixed in gastight manner on a chimney welded to the cubicle in the vicinity of an opening formed through the top face of the cubicle, thereby enabling a conductive element 38 to pass from the inside to the outside of the cubicle. The conductive element 38 is electrically connected to the conductive bar 35 which has an insulating sheath, and to a link conductive element 38 between the connectors 37 and 41 by means of conductive connection pieces 35 received in the connector 37, as is known in this field. In this case, the connection pieces 35 are moved towards each other by a screw that passes through them and is engaged in one end of the conductive elements contained in the electricity lead-in 27', with the connection pieces then clamping onto the ends of the conductive bar 35 and of the link conductive element 38'. The head of the screw is accessible via a duct which opens out to the top of the cross-shaped connector 37 when an insulating cover that closes the duct has been removed, thus making it possible, where necessary, to separate the conductive bar 35 and the conductive link element 38' from the conductive element 38.

The conductive bar 35 engages in a dielectric interface of cylindrical shape in one of the arms of the cross-shaped connector, and the cylindrically-shaped dielectric interface of the opposite bar receives an electricity lead-in 42 through which the link conductive element 38' passes between the connectors 37 and 41. The various engagements are implemented in a manner that is dielectrically leakproof.

By putting an insulating plug (not shown) in one of the interfaces included in the arms of the cross-shaped connector 37, it is possible to use the connector with a conductive bar 35 only or with a cable 36 only.

In this case, the electricity lead-in 42 has a standardized conical portion which enables it to be inserted in one of the ducts of complementary shape of a connector 41 which may optionally be straight or T-shaped as shown in FIG. 5. A single pole cable 36 penetrates into the connector 41 via one of its otherwise free ducts which, for example, is the middle duct of the T-shape in the example described. Electrical interconnection is provided between the bared end of said single-pole cable 36 and the bared end of the link conductor element 38' within the connector 41 in a manner known to the person skilled in the art.

The electricity lead-in 27' is shown mounted in a raised position on a metal tubular element 50 so that it is above the top face FS of the cubicle on which it is positioned. In this case, the tubular element 50 is assumed to be welded to the wall constituting the top face over one of the openings provided through said wall for the electricity lead-ins.

By raising the electricity lead-ins by means of tubular elements 50, it is possible to position current-measuring transformers 34 of toroidal type around said tubular elements, between the top face of the cubicle and the cross-shaped connectors 37 carried by the electricity lead-ins.

Figure 1:
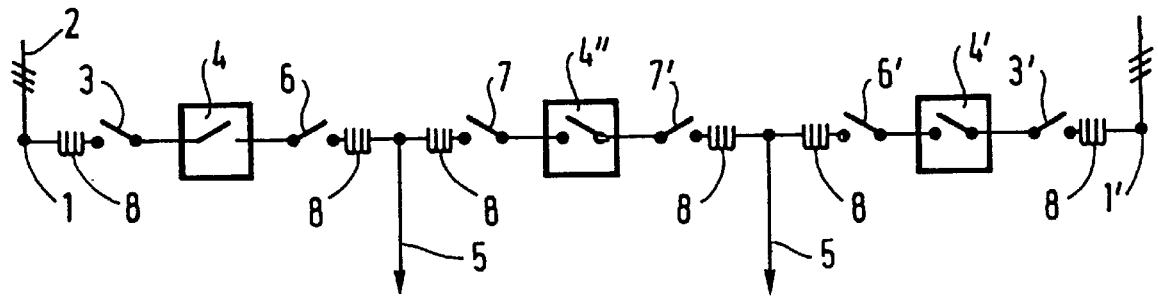
FIG. 1 is a single wire electrical circuit of a "one-and-a-half" type substation that is powered in three phases.
Figure 6:
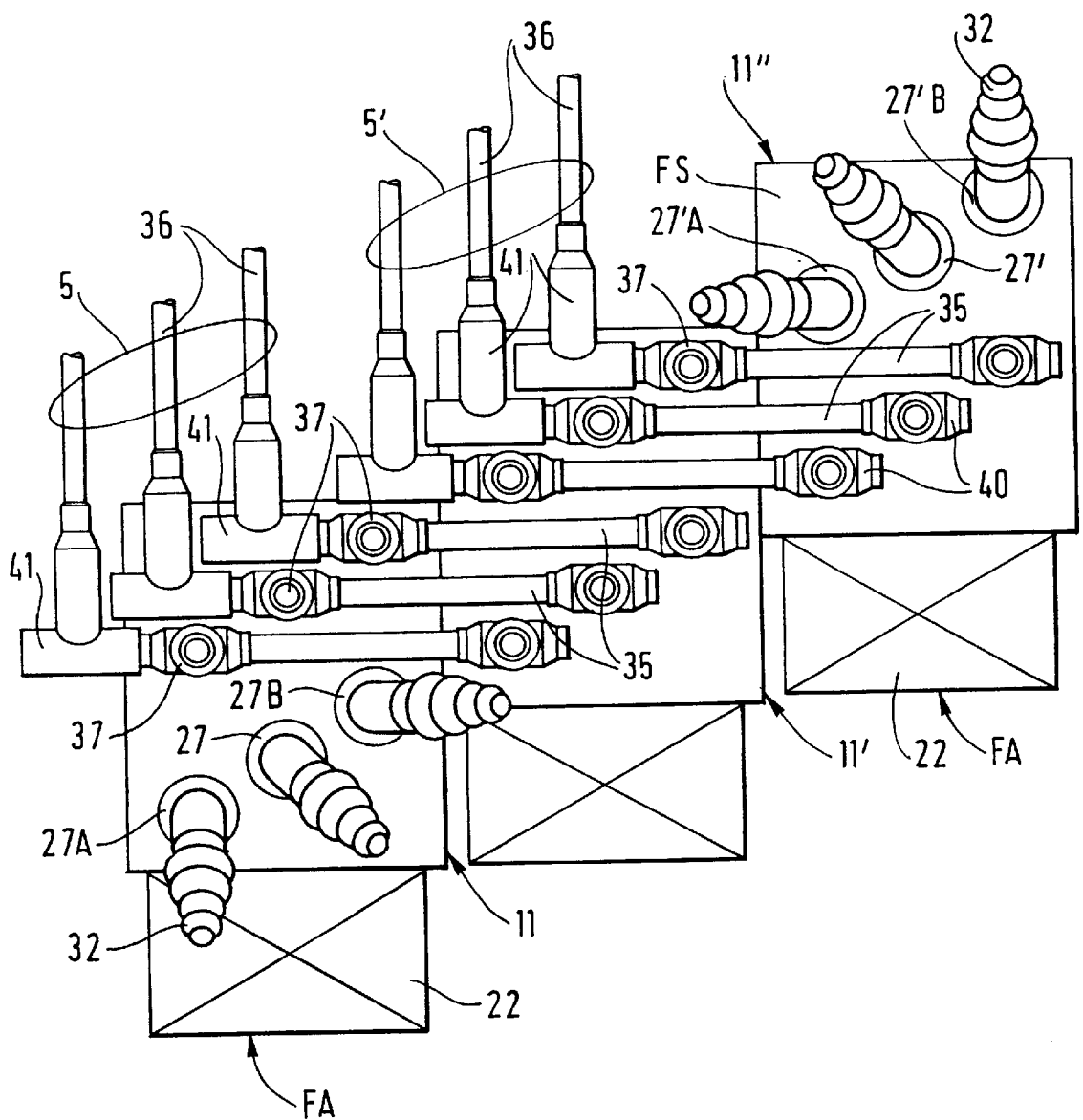
FIG. 6 is a plan view of a "one-and-a-half breaker" type substation of the invention having cells that are offset, with cable connections via T connectors.

FIG. 6 is a plan view of a first embodiment of a "one-and-a-half breaker" type distribution substation as defined electrically by the circuit diagram of FIG. 1, and physically by three cubicle cells 11, 11', and 11" of the type described above, each of said cells having its electricity lead-ins fitted with sleeves or connectors as mentioned briefly above.

The cell based on cubicle 11, situated to the left in the figure, is designed to be connected to an incoming feeder such as 1 in FIG. 1, via three front electricity lead-ins 27, 27a, and 2b fitted with insulating sleeves 32. As mentioned above with reference to FIGS. 2 and 3, each of these front electricity lead-ins is connected to the moving contact of a circuit breaker interrupter chamber, such as 4 in FIG. 1, via a first disconnector, such as 3 (FIG. 1). The cubicle 11 also contains a second disconnector situated downstream from the circuit breaker relative to the incoming feeder 1 and suitable for being used as an intermediate disconnector, like the disconnector 6 in FIG. 1. To this end, cross-shaped connectors 37 cover the outside of the three rear electricity lead-ins of the cubicle 11 which are connected to the fixed conductive tabs of the second disconnector of said cubicle.

Each of the three cross-shaped connectors 37 makes it possible to provide a direct connection to one of the three cables 36 of a first outgoing feeder such as 5 (FIG. 1). In this case, the cables are designed to be connected to the cross-shaped connectors via connectors 41 enabling them to extend rearwards relative to the cubicle 11.

Each of the three cross-shaped connectors 37 fitted to the cell 11 also serves to make a connection with an interconnection conductive bar 35 running parallel to the front face FA of the cubicle of cell 11, above said cubicle and behind said face.

Each of the three interconnection busbars 35 which are parallel, terminates in a connector 40, assumed in this case to be constituted by a cross-shaped connector 37 of the same type, said connectors being respectively located above the front electricity lead-ins of the cubicle 11' of a second cell. The cubicle 11' of the second cell is offset rearwards relative to the cubicle 11 of the first cell beside which it is placed, so that the interconnection busbars 35 which join the rear electricity lead-ins of the cubicle 11 to the front electricity lead-ins of the cubicle 11' extend parallel to the front faces of said cubicles, behind both front faces, and above both cubicles.

The cell having cubicle 11' has three rear electricity lead-ins each capped by a cross-shaped connector 37, suitable for providing a direct connection to one of three cables 36 forming a second outgoing feeder such as 5' (FIG. 1), in the same manner as the cross-shaped connectors 37 on the cubicle 11 for outgoing feeder 5. In this case, the cables are connected to the cross-shaped connectors by connectors 41 which enable the cables to extend rearwards relative to the cubicle 11'.

Each of the three cross-shaped connectors 37 fitted to the rear electricity lead-ins of the cubicle 11' thus enables an interconnection conductive bar 35 running parallel to the front face FA of the cubicle, above the cubicle, and behind said face, to be connected to interconnection busbars 35 themselves connected by connectors 40 to the front electricity lead-ins of the cubicle 11'.

Each of the three parallel interconnection busbars 35 connected to the cross-shaped connectors 37 fitted to the parallel rear lead-ins of the cubicle 11' terminate in an L-shaped or possibly by a T-shaped connector 40 capping a respective one of the three front-electricity lead-ins of the cubicle 11" of a third cell.

The cubicle 11" of the third cell is offset rearwards from the cubicle 11' of the second cell beside which it is placed, in such a manner that the interconnection busbars 35 which join the rear electricity lead-ins of one to the front electricity lead-ins of the other extend parallel to the front faces of the cubicles 11' and 11", under the same conditions as for the interconnection busbars 35 between the cubicles 11 and 11'.

The cell having cubicle 11" has three rear electricity lead-ins fitted with respective insulating sleeves 32 to enable said cell to be connected to an incoming feeder such as 1' (FIG. 1).

A substation organized in the manner described above requires the cubicles of the cells to be offset by about half a cell when going from one cell to the next in order to enable the outgoing cables to be connected.

Naturally, one and or both of the incoming feeders can be implemented in the form of cables, in which case the incoming feeders can be connected via cross-shaped connectors instead of via conductors fitted with insulating sleeves 32.

Given their respective positions, the current-measuring transformers 34 mounted beneath the cross-shaped connectors capping the electricity lead-ins 27, 27A, 27B, 27', 27'A, and 27'B do indeed correspond to the transformers 8 mentioned with reference to FIG. 1.

In the cable variant mentioned above, it is possible to make a substation in which the two cubicles 1 and 1" of the outermost cells are fitted in symmetrical manner relative to a vertical plane including the middle longitudinal axis of the cubicle of the middle cell 1'.

Figure 7:
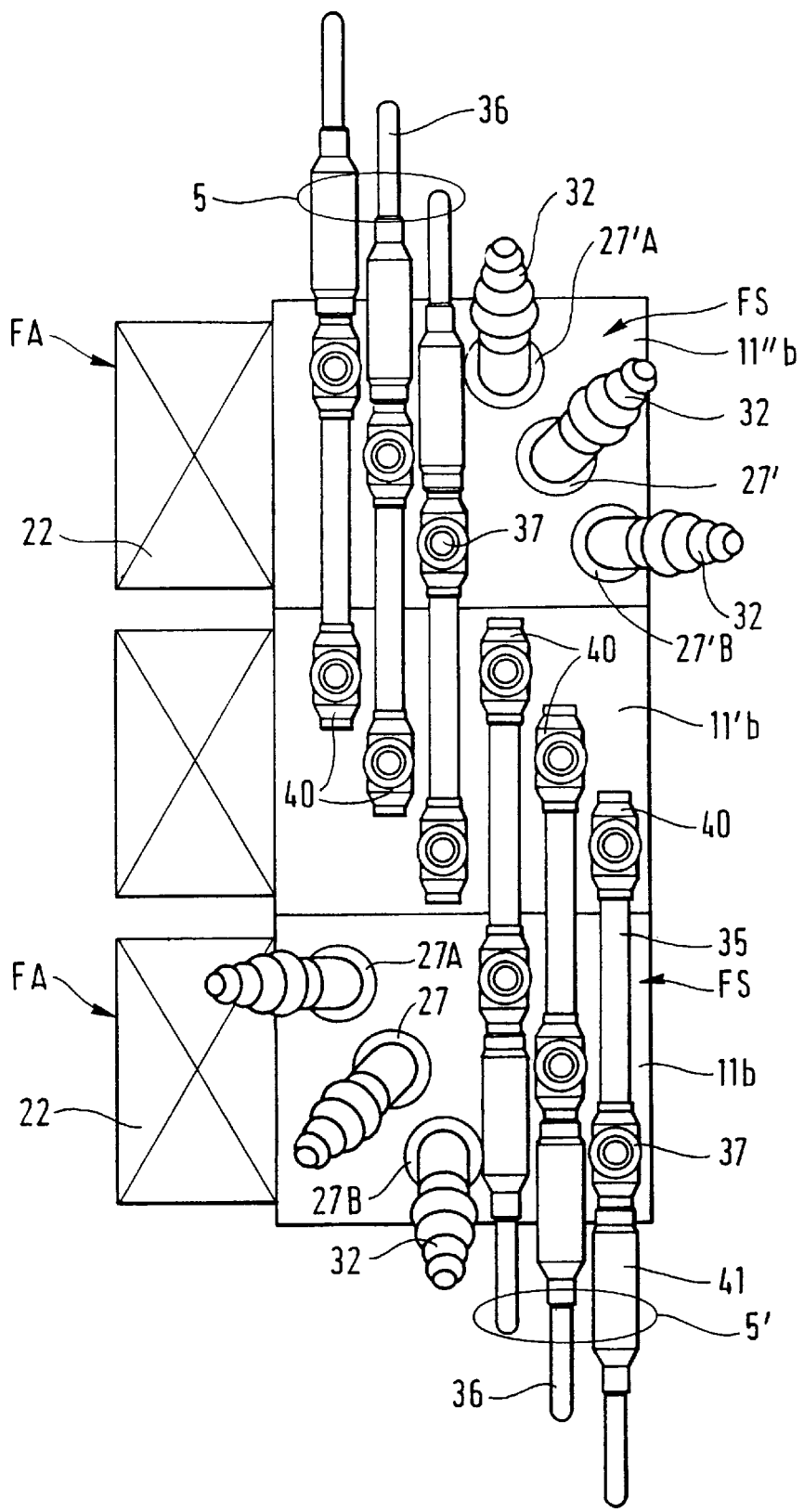
FIG. 7 is a plan view of a "one-and-a-half breaker" type substation of the invention having cells that are in alignment, with cable connections via straight connectors.
Figure 8:
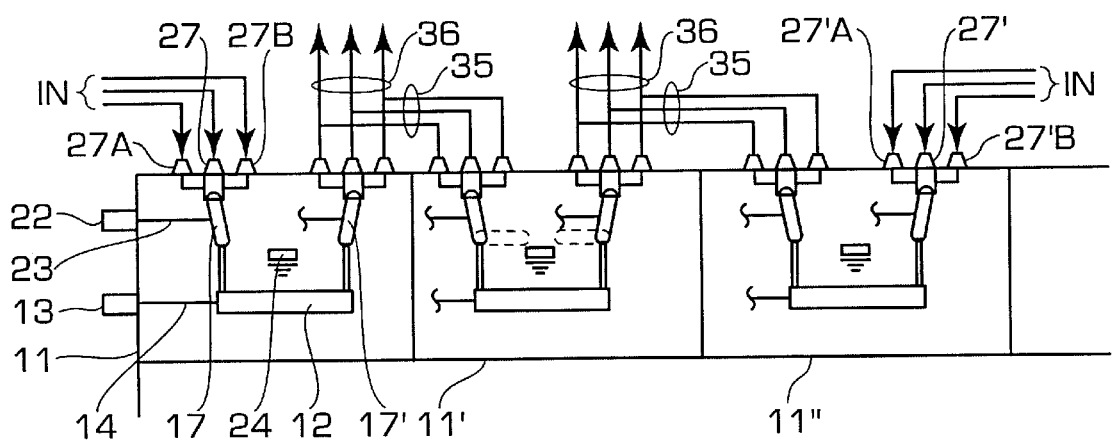
FIG. 8 illustrates the schematic circuit path of the cells of FIG. 2 connected by the cable connections, as shown in FIGS. 6 and 7.

FIG. 7 shows a variant embodiment for a "one-and-a-half breaker" type distribution substation implemented using three cells whose cubicles 11b, 11'b, and 11"b are identical to the cubicles referenced 11, 11', and 11", and having electricity lead-ins which are fitted with sleeves or with cross-shaped connectors as mentioned briefly above, the positions of the outermost cubicles 11b and 11"b being practically interchanged about the middle cubicle 11'b compared with the positions of the cells 11, 11', and 11".

In this example, the cell having cubicle 11"b shown at the top of FIG. 7 would be situated on the left if the front faces of the cells were facing downwards as in FIG. 6, but that is not possible for reasons of available space.

In this case, the cell having cubicle 11"b is designed to be connected to an incoming feeder, such as 1 in FIG. 1, via three rear electricity lead-ins 27', 27'A, and 27'B of the cubicle 11"b each of which is fitted with a respective insulating sleeve 32. Each of these lead-ins is connected to the fixed contact of a circuit breaker interrupter chamber via a second disconnector, as already described. The first disconnector of the cubicle is connected firstly to the front electricity lead-ins of the cubicle and secondly to the moving contacts of the circuit breaker interrupter chambers of the cubicle. The front electricity lead-ins of the cubicle 11"b are capped by connectors like those of the cubicle 11", with the connectors in this case being cross-shaped connectors, referenced 37 as above.

Each of the cross-shaped connectors 37 serves firstly to provide a direct connection to one of the three cables 36 of a first outgoing feeder such as 5 (FIG. 5), and secondly to connect to an interconnection busbar 35 extending parallel to the front face FA of the cubicle of cell 11"b, above the cubicle, and behind said front face.

The cables 36 of the first outgoing feeder 5 reach the cubicle 11"b parallel to the axis on which the cubicles 11b, 11'b, and 11"b are aligned, which axis is parallel to the front faces of the cells, and they do not reach it from the rear as is the case in the embodiment shown in FIG. 6.

Each of the three interconnection busbars 35 connected to one of the connectors 37 of the cubicle 11"b terminates at a connector 40 capping one of the three front electricity lead-ins of the cubicle 11'b of a second cell which is in side by side alignment with the cell having cubicle 11"b.

The three rear electricity lead-ins of the cubicle 11'b are also capped by connectors 40 extending in the opposite direction compared with the connectors capping the three front lead-ins of the cubicle. The connectors 40 connecting the rear electricity lead-ins of the cubicle 11'b receive interconnection busbars 35 extending towards the rear electricity lead-ins of a cubicle 11b constituting the third cell in alignment with the other two cells on the other side of the cubicle 11'b away from the cubicle 11"b.

The rear electricity lead-ins of the cubicle 11b are capped by cross-shaped connectors 37 serving firstly to connect the interconnection busbars 35 which connect the cubicle 11b to the cubicle 11'b, and secondly to provide direct connections to the three cables 36 of a second outgoing feeder such as 5' (FIG. 1). The interconnection busbars 35 interconnecting the cubicles 11b and 11b run parallel to the front faces of said cubicles, behind the front faces and behind the interconnection busbars 35 interconnecting the cubicles 11b and 11"b, with which they are parallel. The cables 36 of the second outgoing feeder 5' reach the cubicle 11b parallel to the axis on which the cubicles 11b, 11'b, and 11"b are in side by side alignment, extending to the other side of the substation made up of said cubicles, and behind the cables 36 of the first outgoing feeder 5, and extending in the opposite direction.

The front electricity lead-ins 27A, 27B, and 27C of cubicle 11b are fitted with insulating sleeves 32 enabling them to be connected to an incoming feeder constituted by an overhead line identical to the incoming feeder mentioned with reference to FIGS. 1 to 6.

Naturally, an analogous substation can be implemented by positioning sleeves 32 on the rear is electricity lead-ins of the cubicle 11b and on the front electricity lead-ins of the cubicle 11"b, with corresponding changes to the connectors and their positions on all three cubicles of a substation organized in this way.

As already mentioned with reference to FIG. 6, one or both of the incoming feeders may be implemented by means of cables, with L-shaped or possibly T-shaped connectors then replacing the incoming feeders implemented in the form of conductors fitted with insulating sleeves 32.

By using three-position disconnectors as mentioned above, it is possible to ground each of the two outgoing feeders by grounding using circuit breakers and disconnectors appropriately connected to ground.

In each of the cases mentioned above, a considerable saving in the overall size of a substation is achieved since the insides of the cubicles are filled with a protective dielectric gas such as $SF_6$, and since electrical isolation is obtained via the interconnection busbars which are sheathed in insulation and at the connectors. In addition, these busbars and these connectors may be of the metal-clad type, e.g. by being covered in a conductive layer with said layer being grounded.

It should also be observed that the live portions are not subjected to the influences of the environment concerning humidity and pollution.

The cubicles of a substation, each fitted in particular with its own circuit breaker, internal disconnectors and external current transformers on the electricity lead-ins can be built and tested in a factory before being taken to site.

Because the assembly is so compact, provision can also be made to show the circuit diagram of a substation on the front of the substation.

We claim:

1. A medium voltage electricity distribution substation, implemented using a "one-and-a-half breaker" type circuit, obtained by associating circuit breakers and disconnectors in an arrangement enabling two distinct outgoing feeder cables to be fed from one and/or the other of two incoming feeder cables and/or overhead lines, wherein the arrangement is made up of three identical, gastight, cubicles in the form of adjacent rectangular parallelepipeds made of sheet metal, each of which receives a circuit breaker and two disconnectors electrically located on opposite sides of the circuit breaker, each cubicle having a top face including through orifices for electricity lead-ins enabling "link" tabs of the disconnectors to be connected by electrical conduction with conductive busbars and/or electrical cables outside the cubicle, said orifices being disposed obliquely in two parallel rows on the top face of the cubicle causing the lead-ins being disposed relative to the front face of the cubicle in a "front" first row of electricity lead-ins, and a "rear" second row of electricity lead-ins, the two outermost cubicles having in one case front lead-ins and in the other case rear lead-ins fitted for connection to the wires of an incoming feeder, whether an overhead line or a cable, the cubicle placed between the other two having firstly one row of lead-ins, either a front row or a rear row, connected by interconnection conductive busbars to the front lead-ins of the adjacent cubicle whose rear lead-ins are fitted for connection to an incoming feeder, and secondly the lead-ins of its other row connected by other interconnection busbars to the rear lead-ins of the adjacent cubicle whose front lead-ins are fitted for connection to an incoming feeder, two of the cubicles each having a row of lead-ins fitted to be connected simultaneously to the interconnection busbars connecting them to the lead-ins of another cubicle as mentioned, and to the cables of a respective different outgoing feeder.

2. A substation according to claim 1, wherein the cubicles are aligned with their interconnection busbars parallel to the alignment axis, and wherein the electricity lead-ins in a same row which are fitted to be connected to outgoing feeder cables are placed on the outermost cubicles and carry connectors enabling each of the cables of an outgoing feeder and also an interconnection busbar to be connected thereto.

3. A substation according to claim 1, wherein the cubicles are disposed side by side in an offset disposition, so that their interconnection busbars which are parallel unite the front electricity lead-ins of each of the cubicles that is offset rearwards relative to an immediately adjacent cubicle with the rear electricity lead-ins of said adjacent cubicle, and wherein the electricity lead-ins in a given row which are fitted to be connected to outgoing feeder cables are the rear lead-ins of the two immediately adjacent cubicles which are the least shifted rearwards.

4. A medium voltage electricity distribution substation, implemented using a one-and-a-half breaker type circuit, obtained by associating circuit breakers and disconnectors in an arrangement enabling two distinct outgoing feeder cables to be fed from one or another of two incoming feeder cables or overhead lines, wherein the arrangement is made up of three identical, gastight cubicles in the form of adjacent rectangular structures, each of which receives a circuit breaker and two disconnectors electrically located on opposite sides of the circuit breaker, each cubicle having a top face including through orifices for electric lead-ins enabling link tabs of the disconnectors to be connected by electrical conduction with conductive busbars or electrical cables outside the cubicle, said lead-ins being disposed relative to the front face of the cubicle in a front first row of electricity lead-ins and a rear second row of electricity lead-ins, two outermost cubicles having in one case front lead-ins and in the other case rear lead-ins fitted for connection to the wires of an incoming feeder, the cubicle placed between the two outermost cubicles having firstly one row of lead-ins, either a front row or a rear row, connected by interconnection conductive busbars to the front lead-ins of the adjacent cubicle whose rear lead-ins are fitted for connection to an incoming feeder, and secondly the lead-ins of its other row connected by other interconnection busbars to the rear lead-ins of the adjacent cubicle whose front lead-ins are fitted for connection to an incoming feeder, two of the cubicles each having a row of lead-ins fitted to be connected to the interconnection busbars connecting them to the lead-ins of another cubicle, and to the cables of a respective different outgoing feeder.

5. A substation according to claim 4, wherein the cubicles are aligned with their interconnection busbars parallel to an alignment axis, and wherein the electricity lead-ins in a same row which are fitted to be connected to outgoing feeder cables are placed on the outermost cubicles and carry connectors enabling each of the cables of an outgoing feeder and also an interconnection busbar to be connected thereto.

6. A substation according to claim 4, wherein the cubicles are disposed side by side in an offset disposition, so that the interconnection busbars which are parallel unite the front electricity lead-ins of each of the cubicles that is offset rearwards relative to an immediately adjacent cubicle with the rear electricity lead-ins of said adjacent cubicle, and wherein the electricity lead-ins in a given row which are fitted to be connected to outgoing feeder cables are the rear lead-ins of the two immediately adjacent cubicles which are the least shifted rearwards.

* * * * *